(12) United States Patent
Lee et al.

(10) Patent No.: US 7,487,517 B2
(45) Date of Patent: Feb. 3, 2009

(54) OPTICAL DISC ACCESS CONTROL AND STORAGE APPARATUS

(75) Inventors: Hsien-der Lee, Taipei (TW); Tsun-san Wang, Taipei (TW)

(73) Assignee: ACARD Technology Corp., Taipei Hsien (TW)

( * ) Notice: Subject to any disclaimer, the term of this patent is extended or adjusted under 35 U.S.C. 154(b) by 404 days.

(21) Appl. No.: 11/455,133

(22) Filed: Jun. 19, 2006

(65) Prior Publication Data

US 2007/0291597 A1    Dec. 20, 2007

(51) Int. Cl.
*G11B 17/03* (2006.01)
(52) U.S. Cl. .................................................... 720/601
(58) Field of Classification Search ................. 720/601, 720/672, 600, 652, 685, 697, 649, 651, 653, 720/659, 646, 647
See application file for complete search history.

(56) References Cited

U.S. PATENT DOCUMENTS

| 5,914,929 A * | 6/1999 | Kato et al. ................... 720/656 |
| 2006/0168603 A1 * | 7/2006 | Goto ........................... 720/619 |
| 2008/0148301 A1 * | 6/2008 | Masaoka et al. ............ 720/601 |

* cited by examiner

*Primary Examiner*—Allen T Cao
(74) *Attorney, Agent, or Firm*—Sughrue Mion, PLLC

(57) ABSTRACT

An optical disc access control and storage apparatus containing a rotating plate for storing discs thereon and rotating the same, a first disc-pushing mechanism for moving a disc along its radial direction from the rotating plate to a second disc-pushing mechanism wherein the second disc-pushing mechanism has a positioning slot for positioning the disc, an auxiliary-fixing mechanism for fixing the disc positioned in the positioning slot, a seizing mechanism for seizing the disc, a rotating mechanism fixed to the seizing mechanism for rotating the seizing mechanism, a coordinate-displacing mechanism connected to the rotating mechanism for controlling the horizontal and vertical positions of the seizing mechanism and at least one disc player for receiving the disc released from the seizing mechanism.

12 Claims, 9 Drawing Sheets

OPTICAL DISC ACCESS CONTROL AND STORAGE APPARATUS

FIELD OF THE INVENTION

This invention relates generally to an optical disc access control and storage apparatus, in particular to an optical disc access control and storage apparatus that can flip a disc and need not accommodate customized disc player(s).

BACKGROUND OF THE INVENTION

Characterized by small size and large volume, optical discs have become one of the best media used by individuals and companies to save data. As technology develops, the recordable areas of an optical disc evolve from a single side of the disc to double sides of the disc and from a single layer of the disc to multiple layers of the disc on each side of the disc. As a result, most individual data can be recorded in one optical disc. However, the volume of one optical disc is not enough for a company, an institution, or a library to save data. They usually need hundreds or thousands of discs to record data. Different type of discs are catalogued by their natures and volumes as compact disc—read only memory (CD-ROM), compact disc—recordable (CD-R), compact disc—rewriteable (CD-RW), digital video—read only memory (DVD-ROM), digital video disc—recordable (DVD-R), and digital video disc—rewritable (DVD-RW) wherein the volume of the CD series optical disc can reach hundreds of megabytes (MB) and the volume of the DVD series optical disc can reach several gigabytes (GB). The recently developed blue ray disc (BD) has eight recordable layers on a single side of a BD and the recordable volume can reach 200 GB. In processing a great amount of data, a user records the data on multiple discs and when the user needs one of the recorded discs, he/she then locates the needed disc and places it into a disc player in a computer to read the recorded data. Therefore, when the amount of recorded discs is large, management of the discs becomes very important.

To overcome the management problem, please see FIG. 1, a conventional art providing an optical disc access control and storage apparatus, which contains a rotating plate 1 having multiple slots therein, a disc-pushing mechanism 2 and a disc player 3 wherein the disc-pushing mechanism 2 contains a frame 21 forming a channel 22 therein for allowing a disc 4 in the rotating plate 1 to stay in place, and a disc-pushing shaft 23 having one end installed in the frame 21 for pushing the disc into the disc player 3, so that the disc player 3 can read the disc 4. A computer connected to the disc access control apparatus through software thereof controls the rotation of the rotating plate 1 to select the disc 4, the operation of the disc-pushing mechanism 2 and the on/off function of the disc player 3. Referring to FIG. 2, another conventional art provides a disc access control apparatus, which contains a rotating plate 1a having multiple slots therein, a disc-pushing mechanism 2a and a disc player 3a wherein the disc-pushing mechanism 2a contains a clamping arm 21a. A computer connected to the disc access control apparatus through software thereof controls the rotation of the rotating plate 1a to select the disc 4a and the clamping arm 21a clamps the disc 4a and deliver the disc 4a to the disc player 3a so that the disc player 3a can read the disc 4a.

However, the conventional arts can only push the elected discs 4, 4a in a single direction, not flip the discs 4, 4a. That is, the discs 4, 4a can only move in the radial direction. Hence, the corresponding disc players 3, 3a have to comply with the moving direction of the optical disc 4, 4a. Therefore, the disc players 3, 3a have to be customized to comply with different designs of different optical disc access control and storage apparatus. To provide different customized disc players, the manufacturers of the optical disc access control and storage apparatus have to devote much more time to design it and the cost of designing and manufacturing the optical disc access control and storage apparatus increases.

Therefore, an optical disc access control and storage apparatus that can flip a disc, need not accommodate a customized disc player, and utilize the disc player of standard specifications in the market is needed.

SUMMARY OF THE INVENTION

A primary object of the present invention is to provide an optical disc access control and storage apparatus that can flip a disc to a desired position. Another object of the present invention is to provide an optical disc access control and storage apparatus, which need not accommodate a customized disc player, and utilizes the disc player of standard specifications in the market.

The present invention in one embodiment relates to an optical disc access control and storage apparatus. The optical disc access control and storage apparatus mainly contains: a rotating plate, a first disc-pushing mechanism, a second disc-pushing mechanism, an auxiliary-fixing mechanism, a seizing mechanism, a rotating mechanism, a coordinate-displacing mechanism, and at least one disc player. The rotating plate contains multiple slots therein for storing a disc and rotating the disc. The first disc-pushing mechanism contains a frame, forming a channel therein for allowing the disc stored on the rotating plate to stay in place, and a disc-pushing shaft, having one end installed in the frame for horizontally pushing the disc. The second disc-pushing mechanism contains: a positioning slot, for positioning the disc pushed by the first disc-pushing mechanism, and a first detecting device, for detecting whether the disc is positioned in the positioning slot. The auxiliary-fixing mechanism contains: a clamp for clamping the disc in the positioning slot, a stretchable arm, having one end connected to the clamp, and a first driving mechanism, for controlling the clamp and the stretchable arm. The seizing mechanism contains multiple claws. The multiple claws are able to pass through a central hole of the disc in the positioning slot when gathered together, then expand outwardly to seize the disc. The rotating mechanism is connected to the seizing mechanism for rotating the seizing mechanism in either a leftward or rightward direction up to 90 degrees respectively. The coordinate-displacing mechanism is connected to the rotating mechanism for controlling vertical or horizontal positions of the seizing mechanism. Each disc player contains a tray stretchably received therein for receiving the disc released from the seizing mechanism. In operation, the optical disc control and storage apparatus selects the disc through software of a computer connected thereto and pushes the disc in the first disc-pushing mechanism to the second disc-pushing mechanism. The auxiliary-fixing mechanism fixes the disc positioned in the second disc-pushing mechanism. The seizing mechanism seizes the disc through the rotating mechanism and the coordinate-displacing mechanism, then the auxiliary-fixing mechanism releases the disc and the seizing mechanism releases the disc to the tray of the player through the rotating mechanism and the coordinate-displacing mechanism.

BRIEF DESCRIPTION OF THE DRAWINGS

The above objects and advantages of the present invention will become more apparent from an ensuing description of a preferred embodiment thereof with reference to the attached drawings, in which.

DETAILED DESCRIPTION OF THE PREFERRED EMBODIMENTS

Figure 1:
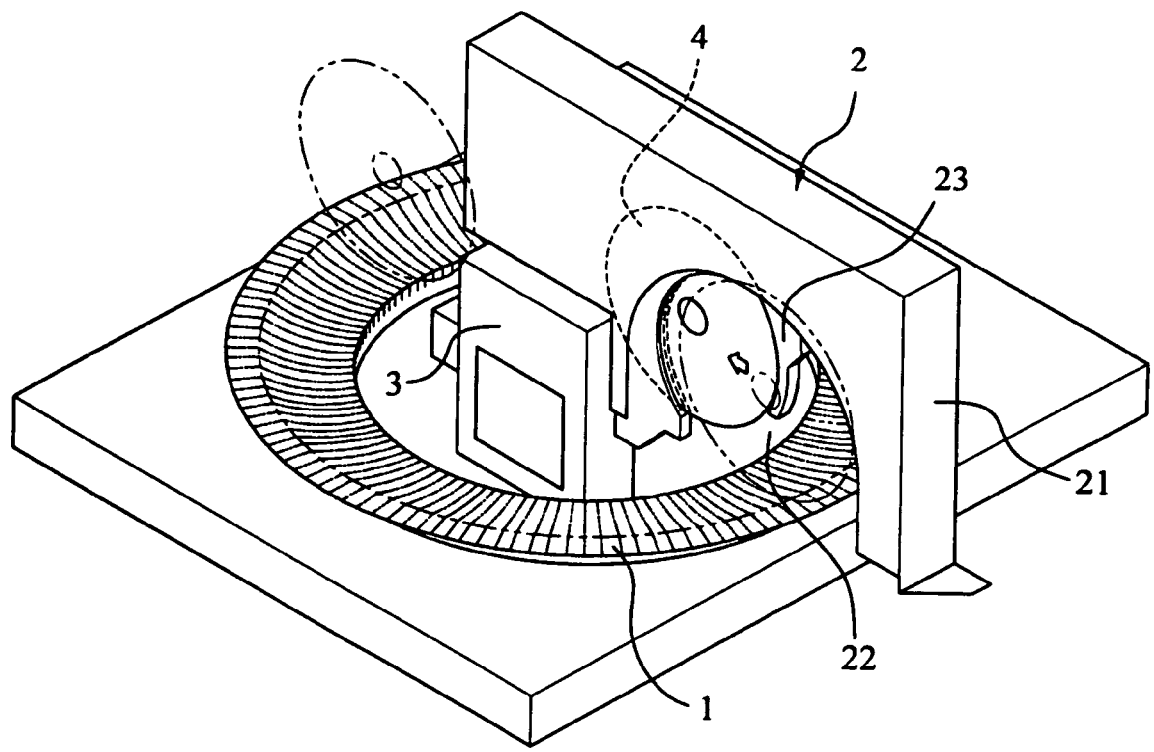
FIG. 1 is a perspective view of a prior art.
Figure 2:
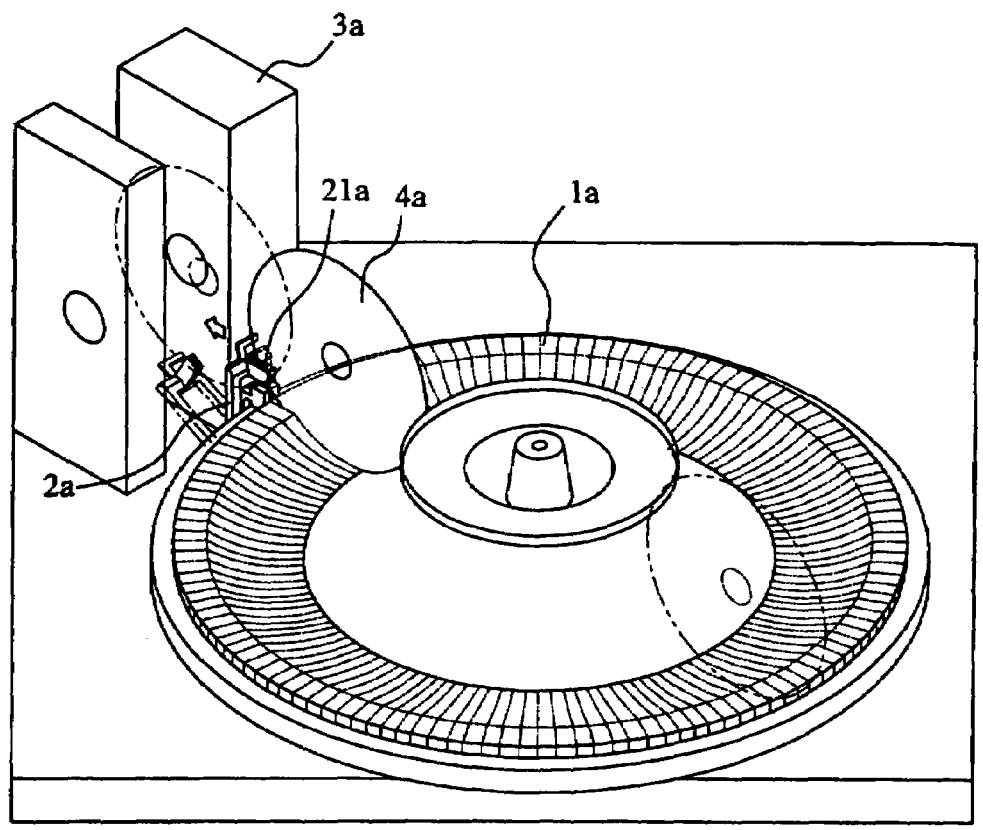
FIG. 2 is a perspective view of another prior art.
Figure 3:
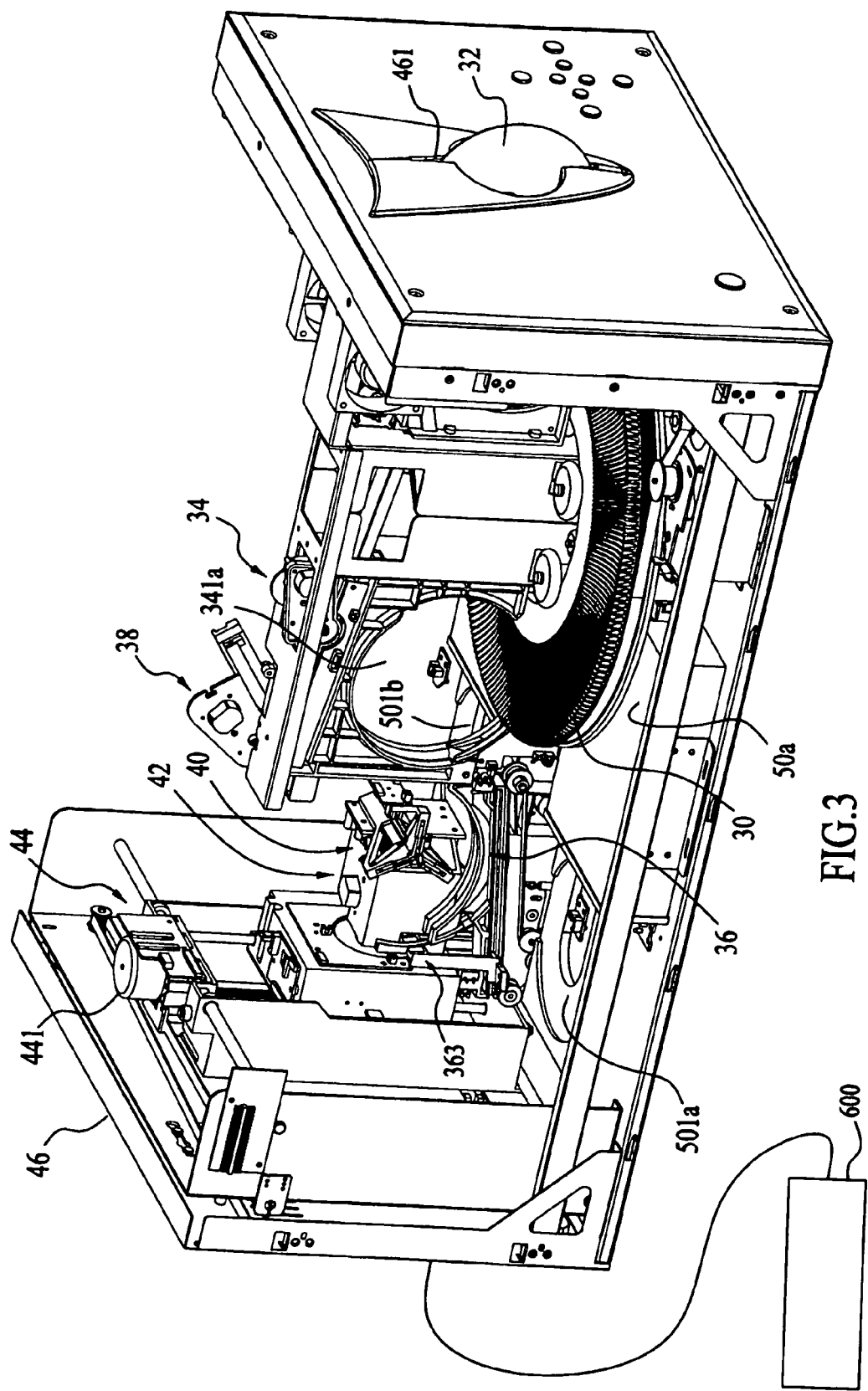
FIG. 3 is a perspective view of an embodiment of the present invention.
Figure 4:
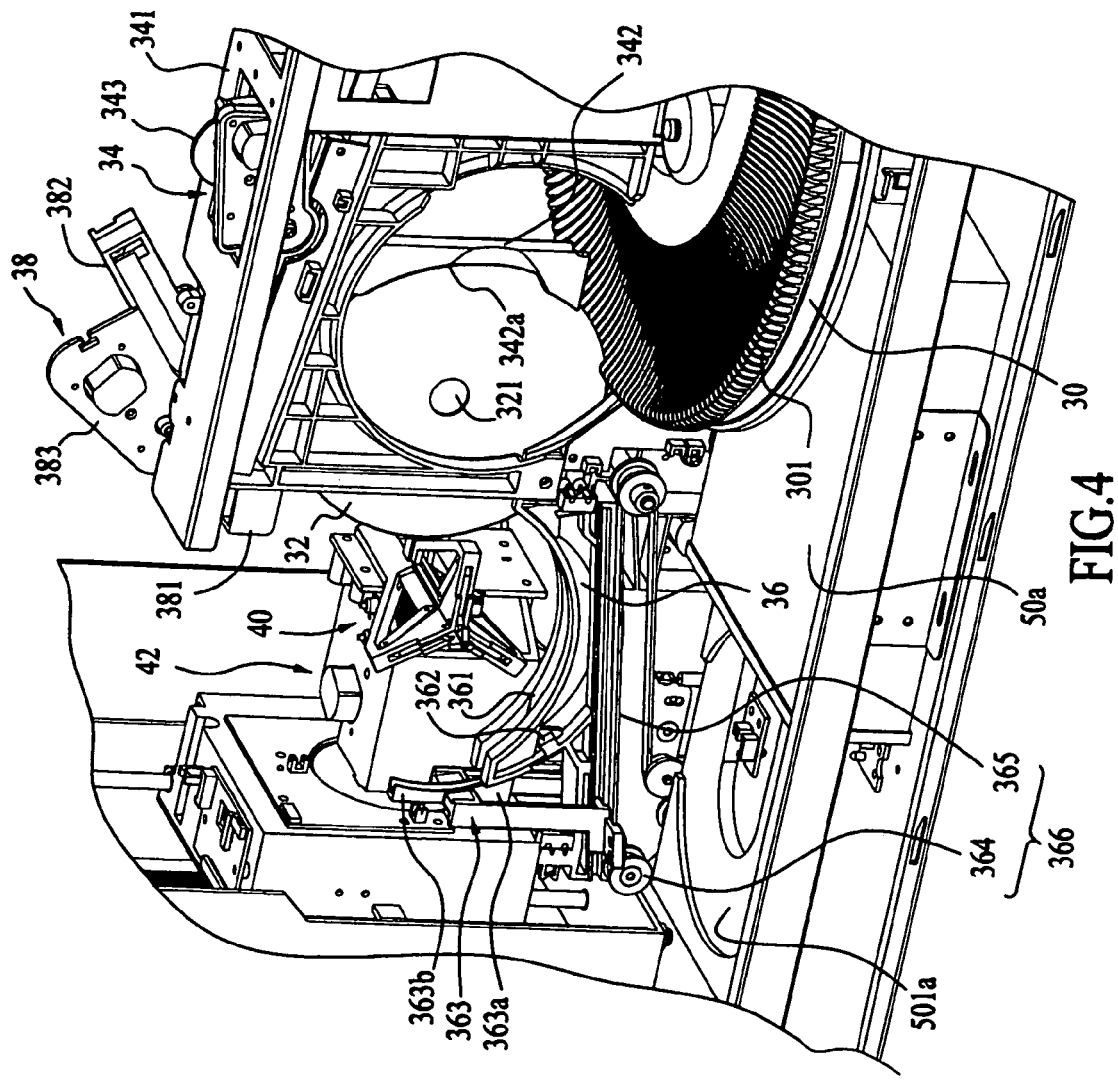
FIG. 4 is a partially enlarged perspective view of the embodiment wherein the disc is pushed from the first disc-pushing mechanism to the second disc-pushing mechanism.
Figure 5:
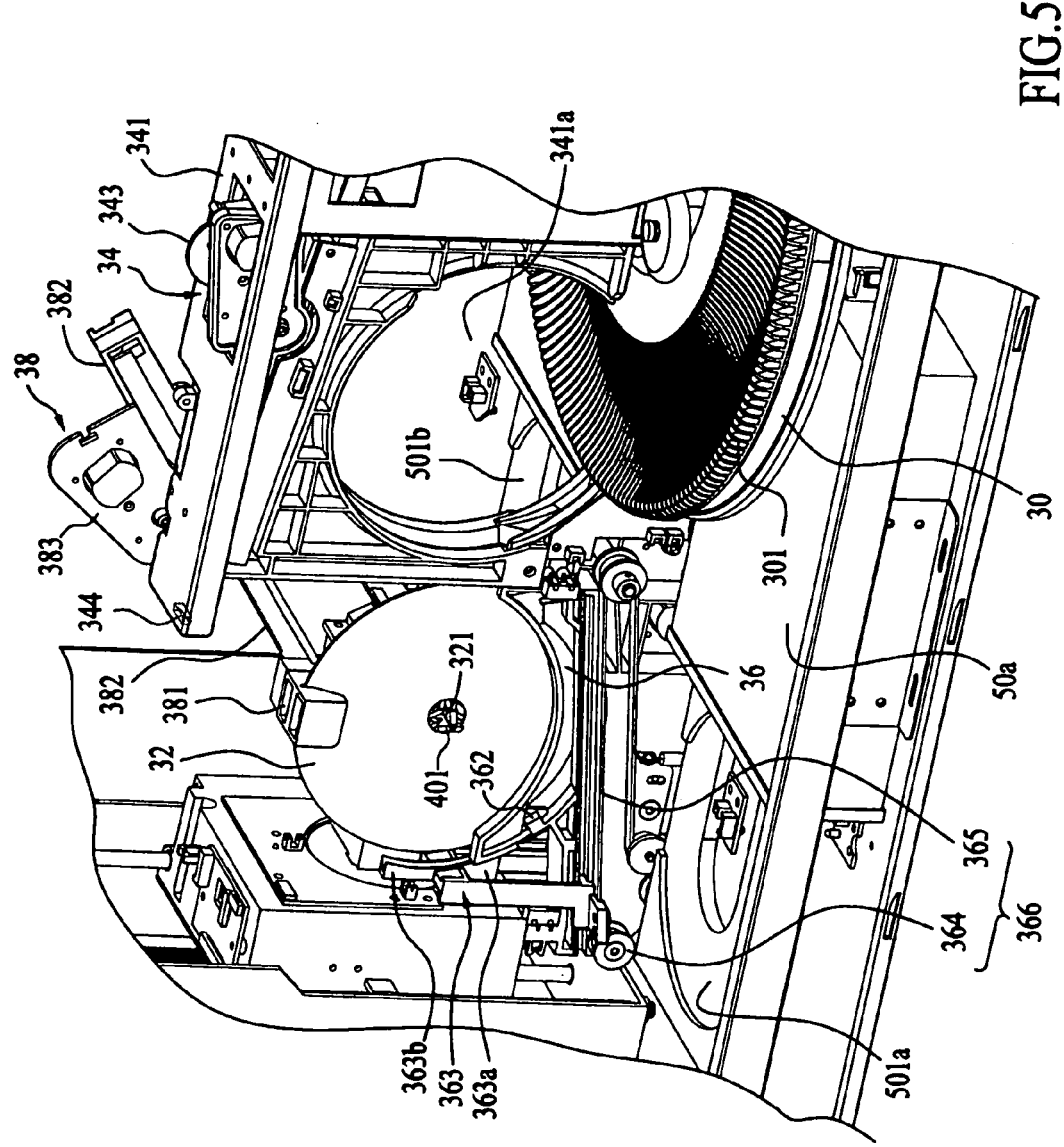
FIG. 5 is another partially enlarged perspective view of the embodiment wherein the disc is positioned in the second disc-pushing mechanism and the clamp of the auxiliary-fixing mechanism fixes the disc for allowing the claws of the seizing mechanism to pass through the central hole of the disc.

With reference to FIGS. 3-7, the first embodiment of the present invention is an optical disc access control and storage apparatus. The optical disc access control and storage apparatus mainly contains: a rotating plate 30, a first disc-pushing mechanism 34, a second disc-pushing mechanism 36, an auxiliary-fixing mechanism 38, a seizing mechanism 40, a rotating mechanism 42, a coordinate-displacing mechanism 44, and two disc players 50a, 50b. Referring to FIGS. 3 and 5, the disc 32 can be placed into multiple slots 301 of the rotating plate 30 through an access opening 461 in an apparatus body 46 of the optical disc access control and storage apparatus. A computer 600 connected to the apparatus controls the rotation of the rotating plate 30 so as to move the disc 32 in the slot 301 to a predetermined position.

With reference to FIGS. 3 and 4, the first disc-pushing mechanism 34 contains: a frame 341 formed with a channel 341a therein for the disc 32 in the rotating plate 30 to stay or pass through and a disc-pushing shaft 342 having one end connected to the second driving mechanism 343 in the frame 341 for controlling the disc-pushing shaft 342 so as to move the disc 32 along the radial direction of the disc 32 wherein the disc-pushing shaft 342 has an arced surface 342a corresponding to an edge of the disc 32. The second driving mechanism 343 contains a motor and a transmission speed-reducing mechanism set. The first disc-pushing mechanism 34 further contains a second detecting device 344 installed thereon, and when the second detecting device 344 detects a clamp 381 of the auxiliary-fixing mechanism 38, the computer 600 generates a signal ordering the disc-pushing shaft 342 to return to its original position.

With reference to FIGS. 4 and 5, the second disc-pushing mechanism 36 contains: a positioning slot 361 for positioning the disc 32 pushed by the first disc-pushing mechanism 34, a first detecting device 362 for detecting whether the disc 32 is located in the positioning slot 361, a pushing element 363 having a through slot 363a therein, which can pass through the positioning slot 361 and a holding element 363b, and the third driving mechanism 366 having a pulley set 364 and a belt set 365 disposed on the pulley set 364. When a user wants to have the disc 32 in the positioning slot 361 return to the rotating plate 30, the pulley set 364 and the belt set 365 of the third driving mechanism 366 drive the pushing element 363 to push the disc 32 back to the multiple slots 301 of the rotating plate 30. Since the pushing element 363 has the through slot 363a therein, which can pass through the positioning slot 361, the pushing element 363 would not be stopped by the positioning slot 361 in the process of pushing the disc 32.

Figure 6:
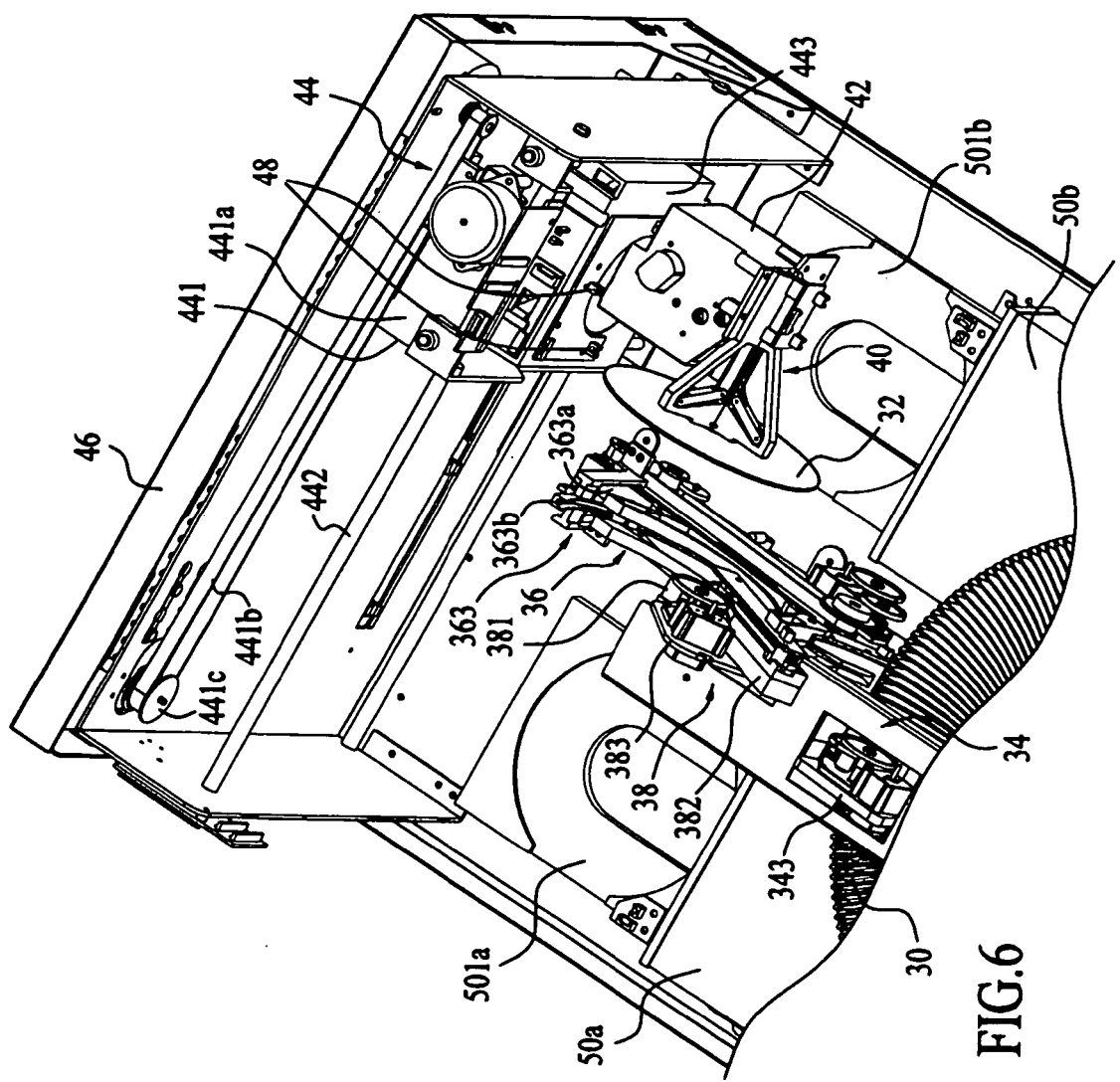
FIG. 6 is a further partially enlarged perspective view of the embodiment wherein the seizing mechanism seizes the disc through its claws and moves the disc above the opened tray of the disc player through the coordinate-displacing mechanism.

With reference to FIGS. 5 and 6, the auxiliary-fixing mechanism 38 contains: the clamp 381, for fixing the disc 32 in the positioning slot 361 of the second disc-pushing mechanism 36, a stretchable arm 382 having one end connected to the clamp 381, and a first driving mechanism 383 for controlling the operations of the clamp 381 and the stretchable arm 382. When the seizing mechanism 40 has seized the disc 32, the computer 600 generates a command ordering the clamp 381 to release the disc 32 and return to its original position.

With reference to FIGS. 6-10, the seizing mechanism 40 contains three claws 401 wherein each of the three claws 401 has a hook 401a disposed at the external side thereof. When the three claws 401 assemble together, they can pass through the central hole 321 of the disc 32 in the positioning slot 361 of the second disc-pushing mechanism 36. When the claws 401 pass through the central hole 321, they expand outwardly such that the hook 401a can seize the disc 32. When it is desired to release the seized disc 32, the expanded claws 401 assemble together and retreat from the central hole 321 of the disc 32 to release the disc 32.

Figure 8:
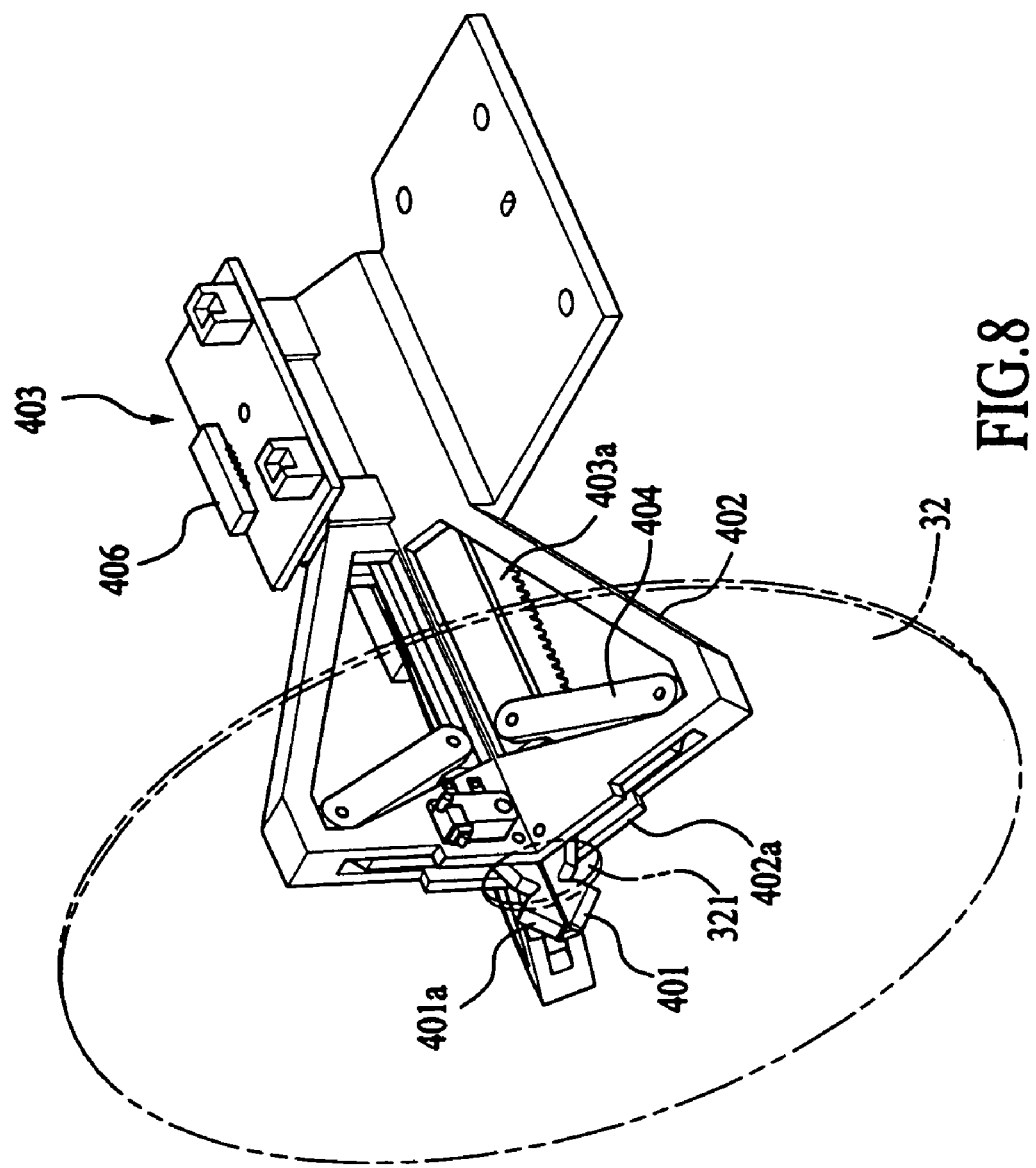
FIG. 8 is a perspective view of the seizing mechanism wherein the stretching element of the stretching mechanism is stretched out to enable the claws of the seizing mechanism to gather together to pass through the central hole of the disc.
Figure 9:
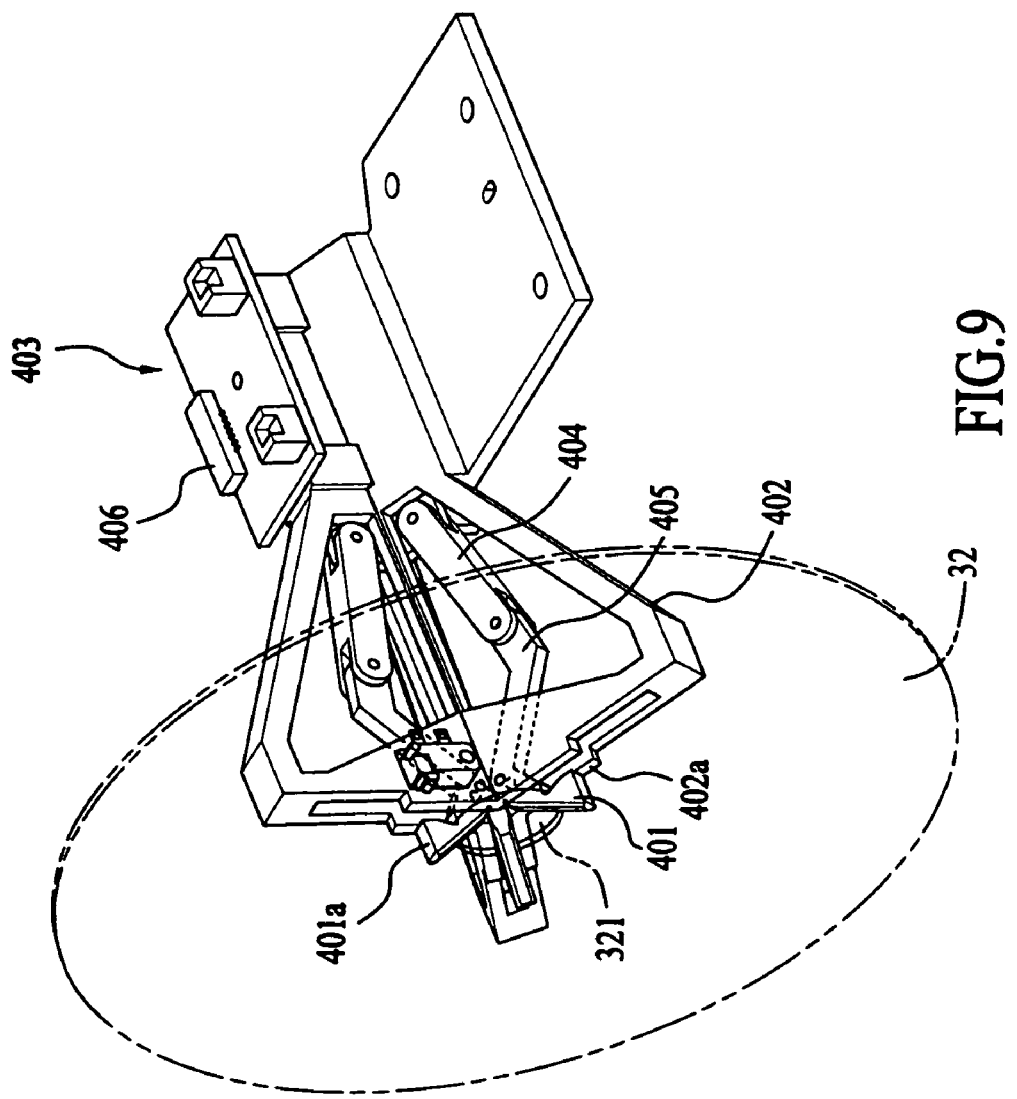
FIG. 9 is another perspective view of the seizing mechanism wherein the stretching element of the stretching mechanism is drawn back to enable the claws of the seizing mechanism to expand outwardly to size the disc against a plane of a truss of the seizing mechanism.

Regarding the specific structures of the seizing mechanism 40, please refer to FIGS. 8 and 9. The seizing mechanism 40 contains a truss 402, a stretching mechanism 403 having an axially movable stretching element 403a, three first rods 404 wherein each of them pivotally connects to the stretching element 403a of the stretching mechanism 403 with one end respectively, and three second rods 405 (see FIG. 9) wherein each of them connects to the other end of the first rod 404 and the other end of each of the second rods 405 firmly fixed to the three claws 401 and also pivotally connected to the truss 402. Therefore, the corresponding angle between each of the claws 401 and the second rod 405 is fixed and when the second rods 405 move, the claws 401 move correspondingly. When the stretching element 403a of the stretching mechanism 403 stretches out, the three claws 401 assemble together through the mechanically interactive relationships between the first rod 404 and the second rod 405. When the stretching element 403a of the stretching mechanism 403 draws back, the three claws 401 expand outwardly and the hooks 401a of the three claws 401 seize the disc 32 against a plane 402a of the truss 402. The operation of the stretching element 403a of the stretching mechanism 403 is controlled by a fourth driving mechanism 406 and the fourth mechanism 406 contains a motor and a transmission speed-reducing mechanism set.

Figure 7:
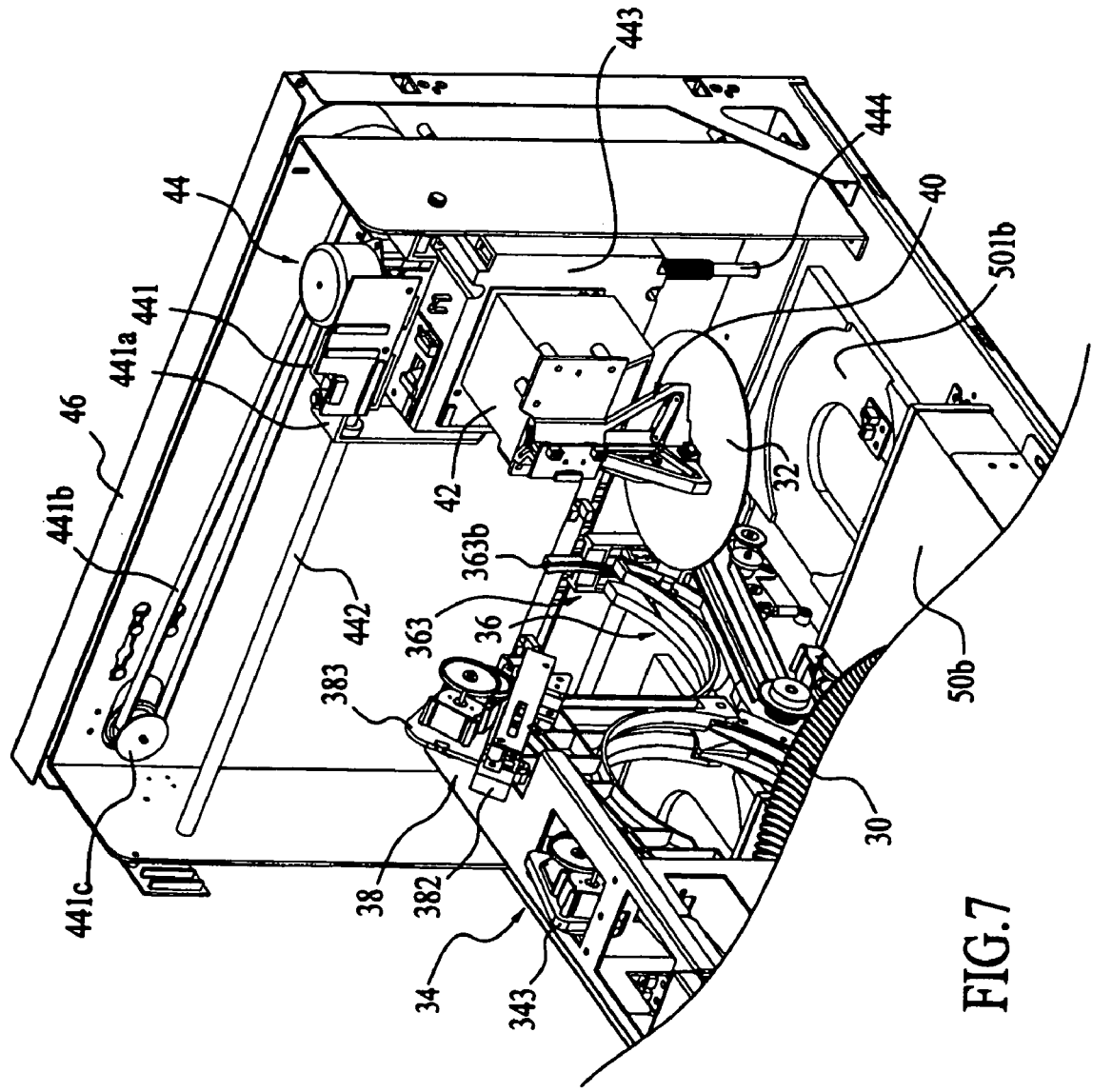
FIG. 7 is a still further partially enlarged perspective view of the embodiment wherein the rotating mechanism rotates the disc to face the opened tray of the disc player.

With reference to FIGS. 6 and 7, the rotation mechanism 42 connects the seizing mechanism 40 for rotating the seizing mechanism 40 in either a leftward or rightward direction up to 90 degrees respectively. To seize the disc 32 in the positioning slot 361 of the second disc-pushing mechanism 36, the rotating mechanism 42 rotates the seizing mechanism 40 such that the three claws 401 face the central hole 321 of the disc 32. Thereafter, to place the disc 32 into the trays 501a, 501b of the disc players 50a, 50b, the rotating mechanism 42 rotates the seizing mechanism 40 by 90 degrees such that the disc 32 can be horizontally placed in the trays 501a, 501b of the disc players 50a, 50b (see FIG. 6).

With reference to FIGS. 6 and 7, the coordinate-displacing mechanism 44 connects to the rotating mechanism 42 for controlling the vertical and horizontal positions of the seizing mechanism 40 in order that the claws 401 of the seizing mechanism 40 are aligned with the central hole 321 of the disc 32. The coordinate-displacing mechanism 44 mainly contains a horizontal movement mechanism 441, a horizontal rod 442, a vertical movement mechanism 443, and a vertical rod 444. The horizontal movement mechanism 441 contains a pulley set 441c and a belt set 441b installed on the pulley set 441c. The horizontal rod 442 horizontally passes through the horizontal movement mechanism 441 and is horizontally installed in the apparatus body 46 of the optical disc access control and storage apparatus for allowing the horizontal movement mechanism 441 to move horizontally along the horizontal rod 442. The vertical movement mechanism 443 is installed in the horizontal movement mechanism 441. The vertical movement mechanism 443 is connected to the rotating mechanism 42. The vertical rod 444 vertically passes through the vertical movement mechanism 443 and is vertically installed in a housing 441a of the horizontal movement mechanism 441 for allowing the vertical movement mechanism 443 to move vertically along the vertical rod 444. Referring to FIG. 6, multiple sensors 48 are installed at the coordinate-displacing mechanism 44 for informing the computer 600 of the position of the coordinate-displacing mechanism 44.

With reference to FIGS. 3 to 7, the two disc players 50a, 50b are installed on two sides of the apparatus respectively. Each of the two disc players 50a, 50b, has a tray 501a, 501b respectively stretchably received therein for receiving the disc 32 released from the seizing mechanism 40. Through the above-mentioned process, a user can select a disc 32 via the computer 600 and put it into the disc player 50a, and similarly select a blank disc and then put it into the disc player 50b; thereby, the user can copy the data in the disc 32 to the blank disc.

The operation process of the apparatus is as follows: (i) selecting a disc 32 through a software of a computer 600 of the optical disc access control and storage apparatus; (ii) rotating the selected disc 32 in the rotating plate 30 to a channel 341a of the frame 341 of the first disc-pushing mechanism 34; (iii) pushing the disc 32 in the rotating plate 30 through the disc-pushing shaft 342 of the first disc-pushing mechanism 34 to the second disc-pushing mechanism 36; (iv) fixing the disc 32 in the positioning slot 361 of the second disc-pushing mechanism 36; (v) seizing the disc 32 through the seizing mechanism 40 via the rotating mechanism 42 and coordinate-displacing mechanism 44; (vi) generating a signal from the computer 600 ordering the clamp 381 of the auxiliary-fixing mechanism 38 to release the disc 32 and return to its original position, and (vii) releasing the disc 32 from the seizing mechanism 40 to the opened trays 501a, 501b of the disc players 50a, 50b through the rotating mechanism 42 and coordinate-displacing mechanism 44.

Similarly, when the user wants to return the disc 32 in the disc players 50a, 50b to the rotating plate 30, the process is as follows: (i) ordering the disc players 50a, 50b to open the trays 501a, 501b, (ii) seizing the disc 32 through the seizing mechanism 40 via the rotating mechanism 42 and the coordinate-displacing mechanism 44; (iii) placing the seized disc 32 into the positioning slot 361 of the second disc-pushing mechanism 36 through the rotating mechanism 42 and the coordinate-displacing mechanism 44; (iv) fixing the disc 32 through the clamp 381 of the auxiliary-fixing mechanism 38 and allowing the claws 401 of the seizing mechanism 40 to retreat from the central hole 321 of the disc 32; and (v) ordering the clamp 381 to release the disc 32 and pushing the disc 32 from the second disc-pushing mechanism 36 to the slot 301 of the rotating plate 30 in the channel 341a by the pushing element 363 of the second disc-pushing mechanism 36.

The invention may also be implemented in other specific modes without departing from the spirit and the essence of the invention. Thus, the above-mentioned embodiments shall be regarded as explanatory but not restrictive. All changes consistent with the meaning and range of the claims and the equivalents shall fall within the scope claimed by the invention.

We claim:

1. An optical disc access control and storage apparatus comprising:
   a rotating plate comprising multiple slots therein for storing discs and rotating the same;
   a first disc-pushing mechanism comprising:
      a frame, forming a channel therein for allowing a disc stored on said rotating plate to stay or pass through; and
      a disc-pushing shaft, having one end installed in said frame for pushing said disc in a radial direction of said disc;
   a second disc-pushing mechanism comprising:
      a positioning slot, for positioning said disc pushed by said first disc-pushing mechanism; and
      a first detecting device, for detecting whether said disc is positioned in said positioning slot;
   an auxiliary-fixing mechanism, comprising:
      a clamp for clamping said disc in said positioning slot;
      a stretchable arm, having one end connected to said clamp; and
      a first driving mechanism, for controlling said stretchable arm and said clamp;
   a seizing mechanism, comprising multiple claws, said multiple claws being able to pass through a central hole of said disc in said positioning slot when gathered together, which then expand outwardly to seize said disc;
   a rotating mechanism, connected to said seizing mechanism for rotating said seizing mechanism in either a leftward or rightward direction up to 90 degrees respectively;
   a coordinate-displacing mechanism, connected to said rotating mechanism, for controlling vertical and horizontal positions of said seizing mechanism; and
   at least one disc player, each said disc player comprising a tray stretchably received therein for receiving said disc released from said seizing mechanism;
   wherein said optical disc access control and storage apparatus selects said disc through a software of a computer connected thereto and pushes said disc in said first disc-pushing mechanism to said second disc-pushing mechanism, said auxiliary-fixing mechanism fixing said disc positioned in said second disc-pushing mechanism, said seizing mechanism seizing said disc through said rotating mechanism and said coordinate-displacing mechanism, then said auxiliary-fixing mechanism releasing said disc and said seizing mechanism releasing said disc to said tray of said player through said rotating mechanism and said coordinate-displacing mechanism.

2. The optical disc access control and storage apparatus of claim 1, wherein when said multiple claws of said seizing mechanism seize said disc, said computer generates a signal ordering said clamp of said auxiliary-fixing mechanism to release said disc and return to its original position.

3. The optical disc access control and storage apparatus of claim 1, wherein said first disc-pushing mechanism further comprises a second driving mechanism for controlling said disc-pushing shaft wherein said disc-pushing shaft has an arced surface corresponding to a side of said disc.

4. The optical disc access control and storage apparatus of claim 1, wherein said first disc-pushing mechanism further comprises a second detecting device installed thereon, and when said second detecting device detects said clamp of said auxiliary-fixing mechanism, said computer generates a signal ordering said disc-pushing shaft to return to its original position.

5. The optical disc access control and storage apparatus of claim 1, wherein said second disc-pushing mechanism further comprises:
 a pushing element comprising a through slot for passing through said positioning slot; and
 a third driving mechanism, comprising:
  a pulley set; and
  a belt set, installed on said pulley set;
 wherein said pulley set and said belt set of said third driving mechanism drive said pushing element to push said disc to said multiple slots of said rotating plate.

6. The optical disc access control and storage apparatus of claim 5, wherein when said first detecting device detects said disc at a predetermined location, said computer generates a signal ordering said third driving mechanism to stop running.

7. The optical disc access control and storage apparatus of claim 1, wherein said coordinate-displacing mechanism comprises:
 a horizontal movement mechanism, comprising a pulley set and a belt set installed thereon;
 a horizontal rod, horizontally passing through said horizontal movement mechanism and horizontally installed in an apparatus body of said optical disc access control and storage apparatus for allowing said horizontal movement mechanism to move horizontally along said horizontal rod;
 a vertical movement mechanism, installed in said horizontal movement mechanism, said vertical movement mechanism connected to said rotating mechanism; and
 a vertical rod, vertically passing through said vertical movement mechanism and vertically installed in a housing of said horizontal movement mechanism for allowing said vertical movement mechanism to move vertically along said vertical rod.

8. The optical disc access control and storage apparatus of claim 7 further comprising multiple sensors installed at said coordinate-displacing mechanism for judging a position of said coordinate-displacing mechanism.

9. The optical disc access control and storage apparatus of claim 1, wherein said seizing mechanism further comprises:
 a truss;
 a stretching mechanism comprising a stretching element that can move axially;
 multiple first rods, having one end pivotally connected to said stretching element of said stretching mechanism; and
 multiple second rods, each of said multiple second rods having one end pivotally connected to the other end of said first rod respectively, the other end of each of said multiple second rods fixed to said multiple claws respectively and pivotally connected to said truss;
 wherein when said stretching element of said stretching mechanism stretches out, said multiple claws gather together, and when said stretching element of said stretching mechanism draws back, said multiple claws expand outwardly to seize said disc against a plane of the truss.

10. The optical disc access control and storage apparatus of claim 9, wherein each of said multiple claws have a hook at its external side, and when said multiple claws expand, said hook seizes said disc.

11. The optical disc access control and storage apparatus of claim 10, wherein said seizing mechanism further comprises a fourth driving mechanism for controlling said stretching mechanism.

12. The optical disc access control and storage apparatus of claim 10, wherein said disc player is a disc player of standard specification.

* * * * *